United States Patent
Sun et al.

(10) Patent No.: US 9,762,385 B1
(45) Date of Patent: Sep. 12, 2017

(54) PROTECTION OF PROGRAM CODE OF APPS OF MOBILE COMPUTING DEVICES

(71) Applicant: Trend Micro Incorporated, Tokyo (JP)

(72) Inventors: Liang Sun, Nanjing (CN); Bo Xiao, Nanjing (CN); Chengyu Fang, Nanjing (CN); Fei Zhuang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 140 days.

(21) Appl. No.: 14/803,836

(22) Filed: Jul. 20, 2015

(51) Int. Cl.
*H04L 9/06* (2006.01)
*H04L 9/32* (2006.01)

(52) U.S. Cl.
CPC .......... *H04L 9/0625* (2013.01); *H04L 9/3234* (2013.01)

(58) Field of Classification Search
CPC ...... G06F 21/125; G06F 21/602; G06F 21/14; G06F 21/6209; G06F 21/6218; G06F 8/71; G06F 21/12; H04L 63/06; H04L 63/08; H04L 63/20
See application file for complete search history.

(56) References Cited

U.S. PATENT DOCUMENTS

| | | | |
|---|---|---|---|
| 5,966,702 A * | 10/1999 | Fresko | G06F 9/44563 |
| 6,470,413 B1 * | 10/2002 | Ogawa | G06F 12/023 |
| | | | 348/231.7 |
| 6,907,530 B2 | 6/2005 | Wang | |
| 7,340,058 B2 | 3/2008 | Jakobsson et al. | |
| 8,756,432 B1 | 6/2014 | Chen | |
| 8,806,641 B1 | 8/2014 | Li | |
| 8,892,876 B1 * | 11/2014 | Huang | G06F 21/6218 |
| | | | 713/165 |
| 9,092,615 B1 | 7/2015 | Mao | |
| 2002/0099940 A1 | 7/2002 | Wang | |
| 2002/0147044 A1 | 10/2002 | Jakobsson et al. | |
| 2004/0261021 A1 | 12/2004 | Mittal | |
| 2005/0141706 A1 | 6/2005 | Regli et al. | |
| 2005/0173518 A1 | 8/2005 | Takayama | |
| 2005/0202803 A1 | 9/2005 | Mahalal | |
| 2006/0241933 A1 | 10/2006 | Franz | |
| 2007/0127418 A1 | 6/2007 | Pekkala et al. | |
| 2010/0292556 A1 | 11/2010 | Golden | |
| 2011/0113473 A1 | 5/2011 | Corda et al. | |
| 2011/0320359 A1 | 12/2011 | Li et al. | |
| 2012/0002654 A1 | 1/2012 | Pekkala et al. | |

(Continued)

*Primary Examiner* — Kambiz Zand
*Assistant Examiner* — Abiy Getachew
(74) *Attorney, Agent, or Firm* — Okamoto & Benedicto LLP

(57) ABSTRACT

Original program code of an app of a mobile operating system is protected by splitting the original program code into several program code segments and encrypting the program code segments. The encrypted program code segments are received in separate files in a mobile computing device, where the encrypted program code segments are loaded in memory of the mobile computing device. The encrypted program code segments are decrypted, and the resulting decrypted program code segments are stored in non-contiguous blocks of memory. The decrypted program code segments are parsed for loading and execution in the mobile computing device, such as by a Dalvik process virtual machine of an ANDROID operating system of the mobile computing device.

18 Claims, 5 Drawing Sheets

(56) References Cited

U.S. PATENT DOCUMENTS

| | | |
|---|---|---|
| 2012/0222129 A1 | 8/2012 | Racciopi et al. |
| 2013/0117850 A1 | 5/2013 | Britton et al. |
| 2013/0117854 A1 | 5/2013 | Britton et al. |
| 2013/0291123 A1 | 10/2013 | Rajkumar et al. |
| 2013/0307784 A1 | 11/2013 | Matsuzawa |
| 2014/0006032 A1 | 1/2014 | Korn |
| 2014/0113683 A1 | 4/2014 | Hickey |
| 2014/0149488 A1* | 5/2014 | Bialy ............... H04L 65/80 709/203 |
| 2014/0248929 A1 | 9/2014 | Noonan |
| 2015/0220514 A1 | 8/2015 | Zhang |

* cited by examiner

PROTECTION OF PROGRAM CODE OF APPS OF MOBILE COMPUTING DEVICES

BACKGROUND OF THE INVENTION

1. Field of the Invention

The present invention relates generally to mobile computing device security.

2. Description of the Background Art

Mobile operating systems are designed to work on computers that are constrained in terms of memory and processor speed. An application program for a mobile operating system, referred to as an "app," is especially designed to work with the corresponding mobile operating system. Apps may be readily obtained from app stores.

The ANDROID operating system is a popular mobile operating system employed in mobile computing devices, including smartphones and tablets. An app for the ANDROID operating system comes in a file referred to as the ANDROID application package (APK) file. The APK file contains, among other data, a Dalvik executable (DEX) file that contains DEX program code, which is parsed and loaded by a Dalvik process virtual machine (Dalvik VM) for execution at runtime.

One problem with APK files is that they can be readily tampered. More specifically, an APK file can be unpacked to expose the included DEX file. The DEX program code of the DEX file can then be reversed engineered or modified for malicious, copying, or other purposes. As a particular example, the DEX file may be infected with a computer virus and repackaged back into the APK file.

SUMMARY

In one embodiment, original program code of an app of a mobile operating system is protected by splitting the original program code into several program code segments and encrypting the program code segments. The encrypted program code segments are received in separate files in a mobile computing device, where the encrypted program code segments are loaded in memory of the mobile computing device. The encrypted program code segments are decrypted, and the resulting decrypted program code segments are stored in non-contiguous blocks of memory. The decrypted program code segments are parsed for loading and execution in the mobile computing device, such as by a Dalvik process virtual machine of an ANDROID operating system of the mobile computing device.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software. Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

An original DEX program code of a DEX file may be protected from tampering by encrypting the entirety of the DEX file and including a stub DEX file in the APK file. When the app is initialized, the DEX program code of the stub DEX file is loaded first and decrypts the encrypted DEX file into memory. The internal application programming interface (API) of the Dalvik VM is used to parse the decrypted DEX program code and add the parsing results into the PathClassLoader search list to allow the execution of the original DEX program code. This approach prevents static analysis and reverse engineering of the original DEX program code because the original DEX program code is encrypted as stored in the APK file. However, at runtime, the original DEX program code is not encrypted as loaded in the memory. The inventors believe that this presents a major security issue because a cybercriminal may perform a memory dump to gain access to the original DEX program code. As a particular example, the cybercriminal may use the GDB debugger to attach to a thread of the main app process and then use the GCORE command in the GDB debugger to dump the contents of the memory. As another example, command line tools, such as the dd command line utility, may be used to read/proc/<pid>/mem, where <pid> is the process id of the thread of the main app process. After getting the original DEX program code from memory, a publicly available toolchain may be used to decompile the original DEX program code.

Figure 1:
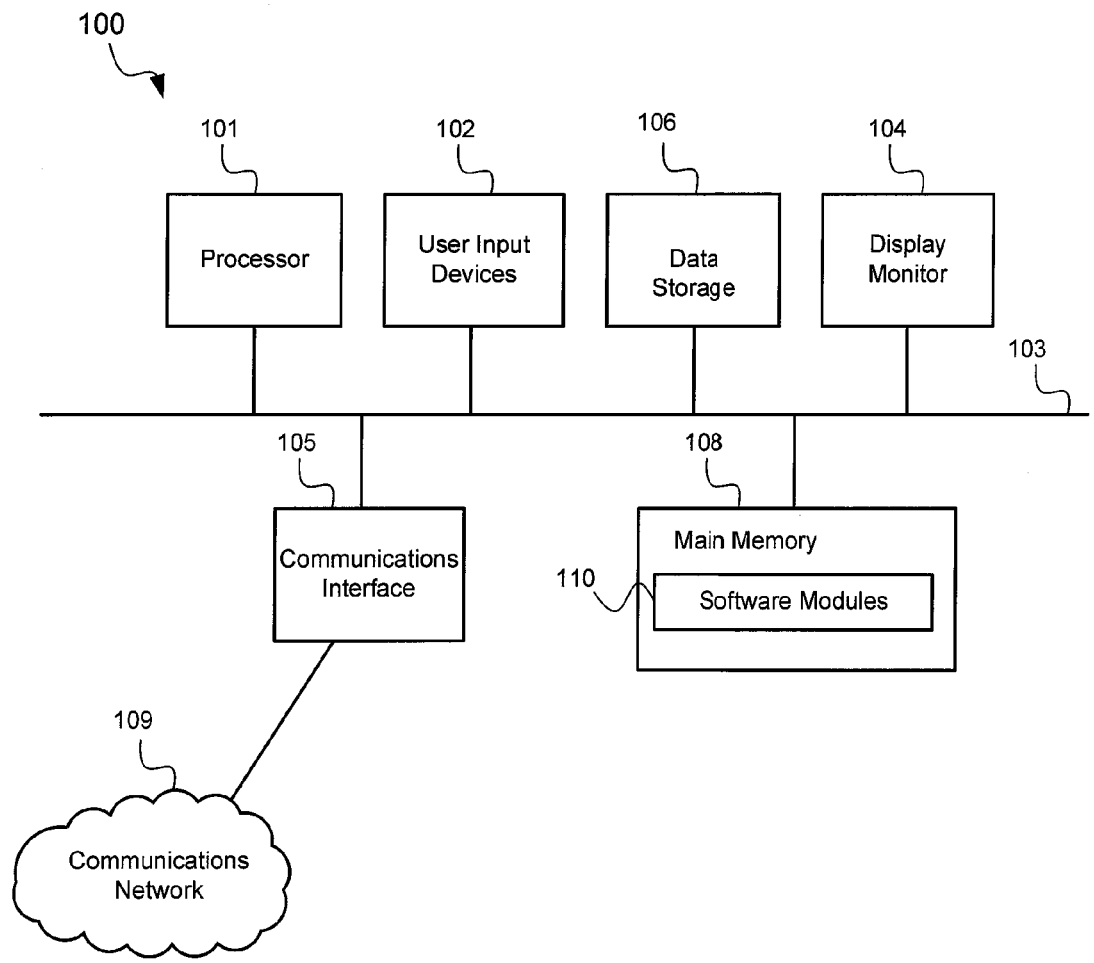
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., touch screen, keyboard, mouse), one or more data storage devices 106 (e.g., hard drive, optical disk, USB memory), a display monitor 104 (e.g., LCD, flat panel monitor, CRT), a communications interface 105 (e.g., network adapter, modem, cellular interface), and a main memory 108 (e.g., RAM). The communications interface 105 may be coupled to a communications network 109, which may include the Internet.

The computer 100 is a particular machine as programmed with software modules 110. The software modules 110 comprise program code stored non-transitory in the main memory 108 for execution by the processor 101. As an example, the software modules 110 may comprise program code of a DEX shield library and of DEX program code segments when the computer 100 is employed as a mobile computing device.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
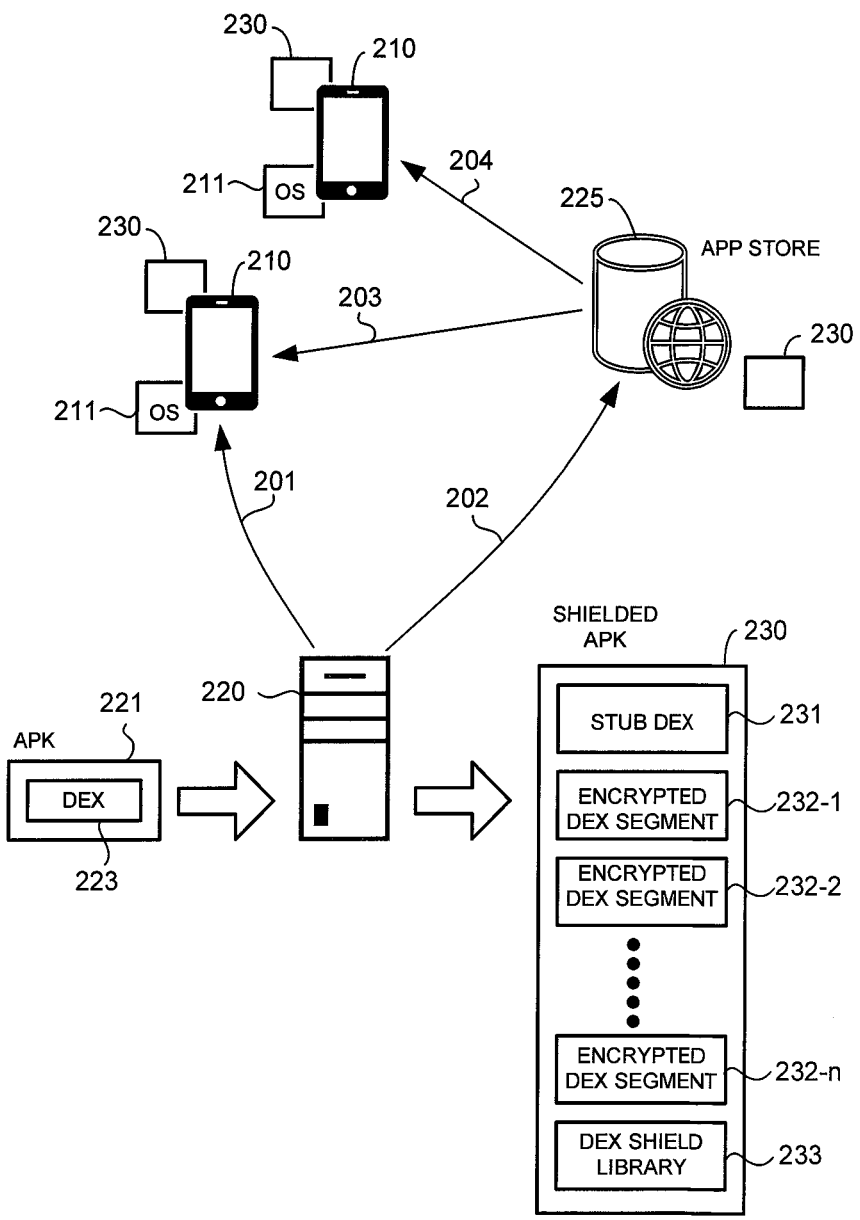
FIG. 2 shows a schematic diagram of a system for protecting program code of apps of mobile computing devices in accordance with an embodiment of the present invention.

FIG. 2 shows a schematic diagram of a system for protecting program code of apps of mobile computing devices in accordance with an embodiment of the present invention. In one embodiment, the system protects DEX program code of apps for the ANDROID operating system.

In the example of FIG. 2, the system includes a plurality of mobile computing devices 210 and one or more packaging servers 220. In the example of FIG. 2, a mobile computing device 210 is an ANDROID device running an ANDROID operating system 211. For example, the mobile computing device 210 may comprise an ANDROID smartphone or tablet. Accordingly, the use of the terms "object," "method", and "class" in the context of program code in this disclosure refers to the use of those terms in object oriented programming (OOP) and ANDROID programming in general.

A packaging server 220 comprises one or more computers that receive an APK file 221 and generate a shielded APK file 230 from the APK file 221. The shielded APK file 230 may comprise, among other components, a stub DEX file 231, a plurality of files of encrypted DEX program code segments 232 (i.e., 232-1, 232-2, . . . , 232-n), and a DEX shield library 233. More particularly, each DEX program code segment 232 is in a separate DEX program code segment file. The shielded APK 230 may be provided to one or more mobile computing devices 210 directly (see arrow 201) or by way of an app store 225 (see arrows 202-204).

The packaging server 220 may include suitable software, such as scripts, debuggers, and other tools for preventing tampering of original DEX program code of a DEX file 223 of the APK file 221. Generally speaking, an APK file, such as the APK file 221 and the shielded APK file 230, may comprise a plurality of components including a DEX file, a manifest, a resource file, etc. Some of these components are not shown for clarity of illustration.

In the example of FIG. 2, the original DEX program code of the DEX file 223 is split into separate segments, which are separately encrypted. More particularly, the original DEX program code is divided into several DEX program code segments 232, with the DEX program code segments 232 being separately encrypted into encrypted DEX program code segments 232 that are stored as separate files in the shielded APK file 230.

Figure 3:
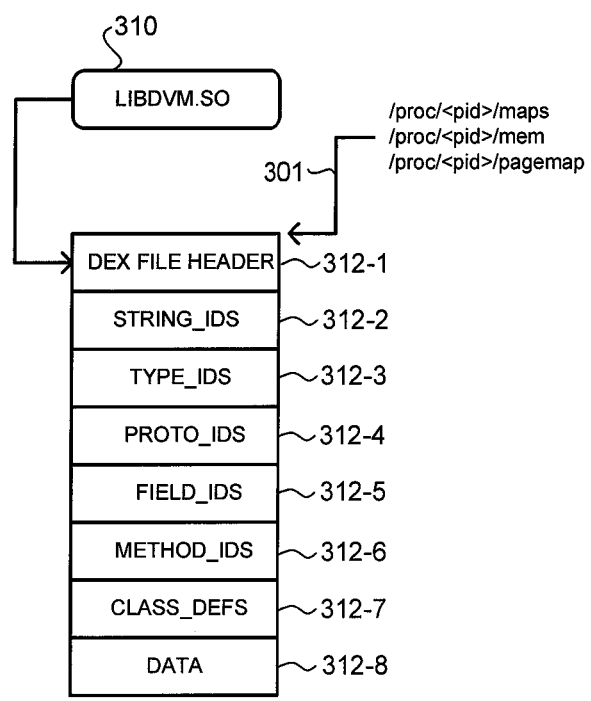
FIG. 3 shows a standard memory layout of a DEX program code of a DEX file in memory.

As shown in FIG. 3, a standard DEX program code has several parts, including a DEX file header 312-1, a string identifiers list 312-2, a type identifiers list 312-3, a method prototype identifiers list 312-4, a field identifiers list 312-5, a method identifiers list 312-6, a class definitions list 312-7, and a data area 312-8. In one embodiment, an encrypted DEX program code segment 232 is an encrypted version of a part 312 (i.e., 312-1, 212-2, etc.) of the original DEX program code. For example, an encrypted DEX program code segment 232-1 may comprise an encrypted DEX file header 312-1 of the original DEX program code, an encrypted DEX program code segment 232-2 may comprise an encrypted string identifiers list 312-2 of the original DEX program code, etc. In one embodiment, each encrypted DEX program code segment 232 is stored in a separate file in the shielded APK file 230. For example, assuming eight encrypted DEX program code segments 232, the APK file 230 will include eight encrypted DEX program code segment files.

In the example of FIG. 2, the shielded APK 230 includes, in addition to the plurality of encrypted DEX program code segments 232, the stub DEX file 231 and the DEX shield library 233. In one embodiment, the stub DEX file 231 comprises program code that is loaded for execution by a Dalvik VM of an ANDROID operating system 211 when the app corresponding to the shielded APK 230 is launched. The stub DEX file 231 includes program code that allows the DEX shield Library 233 to be dynamically loaded when the Dalvik VM initializes an instance of application. In one embodiment, the DEX shield library 233 comprises program code that decrypts the encrypted DEX program code segments 232 into randomly assigned and non-contiguous memory blocks, modifies the decrypted DEX program code segment 232 that corresponds to the DEX file header of the original DEX program code, and parses the decrypted DEX program code segments 232 for loading and execution by the Dalvik VM. In one embodiment, the decrypted DEX program code segment 232 that corresponds to the DEX file header of the original DEX program code is modified in memory by filling the DEX file header with random data except for id (identifier) size fields that may be used during DEX runtime.

FIG. 3 shows a standard memory layout of DEX program code of DEX file in memory (e.g., memory 108). The memory layout of the DEX program code in FIG. 3 is standard in that it conforms to the ANDROID operating system specification. The DEX program code includes the DEX file header 312-1, which includes a magic number identifying the DEX file as such and offsets to the DEX file parts, such offsets to the string identifiers list 212-2, type identifiers list 212-3, etc. the Dalvik VM library 310 (libdvm.so) implements the Dalvik VM, which performs DEX program code parsing and loading. A cybercriminal may find the location of the DEX file header 312-1 in memory by using command line tools to look for the magic number (see arrow 301). Once the DEX file header 212-1 is found, the locations of the other DEX file parts in memory may also be found. In marked contrast, in embodiments of the present invention, the resulting modified DEX file header in memory and non-standard layout of the decrypted DEX program code segments 232 in memory, among other features, prevent tampering of the original DEX program code.

Figure 4:
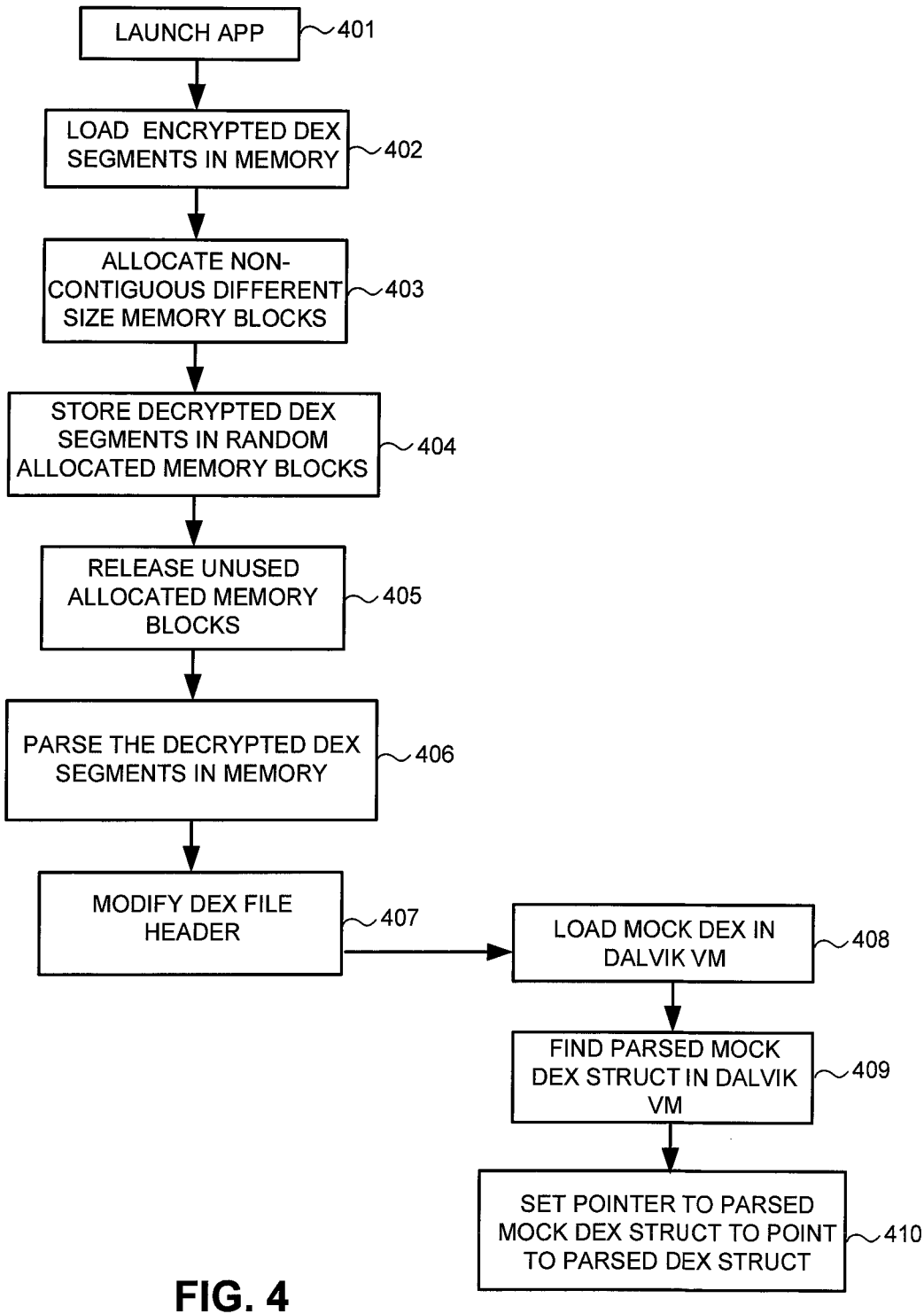
FIG. 4 shows a flow diagram of a method of protecting program code of apps of mobile computing devices in accordance with an embodiment of the present invention.

FIG. 4 shows a flow diagram of a method of protecting program code of apps of mobile computing devices in accordance with an embodiment of the present invention.

The method of FIG. 4 may be performed by the processor of a mobile computing device 210 on a received shielded APK file 230.

In the example of FIG. 4, an app with the shielded APK file 230 is launched (step 401) by, for example, a user selecting an icon of the app on a touchscreen of the mobile computing device 210. This results in the program code of the stub DEX file 231 being loaded by the Dalvik VM of the ANDROID operating system 211 running on the mobile computing device 210. The DEX shield library 233 is dynamically loaded by the Dalvik VM when the Dalvik VM initializes an instance of application. Therefore, launching the app loads the program code of the DEX shield library 233, thereby allowing the program code of the DEX shield library 233 to perform the following steps of loading the encrypted DEX program code segments in memory, decrypting the encrypted DEX program code segments 232, storing the decrypted DEX program code segments 232 in memory, parsing the decrypted DEX program code segments 232 to generate a parsed DEX structure (i.e., data structure) that is in accordance with the Dalvik VM, and providing the parsed DEX structure to the Dalvik VM.

Each encrypted DEX program code segment 232 is read from its corresponding file in the shielded APK file 230 and then loaded in memory (step 402). The encrypted DEX program code segments 232 may be loaded into memory in the app initialization callback of the program code of the stub DEX file 231. Non-contiguous memory blocks of varying sizes are allocated (step 403) for decrypted DEX program code segments 232. In one embodiment, memory blocks of different sizes are allocated by calling the mmap API several times, e.g., more than the number of encrypted DEX program code segments 232, to ensure that the allocated blocks of memory are non-contiguous, i.e., do not have continuous memory addresses. For example, assuming eight encrypted DEX program code segments 232, the mmap API may be called more than 8 times.

Each encrypted DEX program code segment 232 is decrypted and the resulting decrypted DEX program code segment 232 is randomly assigned to one of the allocated memory blocks for storage (step 404). For example, a number of allocated memory blocks equal to the number of encrypted DEX program code segments 232 may be randomly selected from among the allocated memory blocks, and each decrypted DEX program code segment 232 may be stored in one of the randomly selected memory blocks. Unused allocated memory blocks are then released (step 405). The decrypted DEX program code segments 232 are parsed in memory (step 406) to generate parsed DEX structures that provide an internal representation of the decrypted DEX program code segments 232 in the Dalvik VM. More specifically, the decrypted DEX program code segments 232 are parsed by the program code of the DEX shield library 233 to create DvmDex and DexFile structs (i.e., C programming language data structures) that are in accordance with the Dalvik VM. After the decrypted DEX program code segments 232 are parsed, the decrypted DEX program code segment 232 that corresponds to the file header 312-1 may be modified in memory to prevent identification and reverse engineering (step 407).

Figure 5:
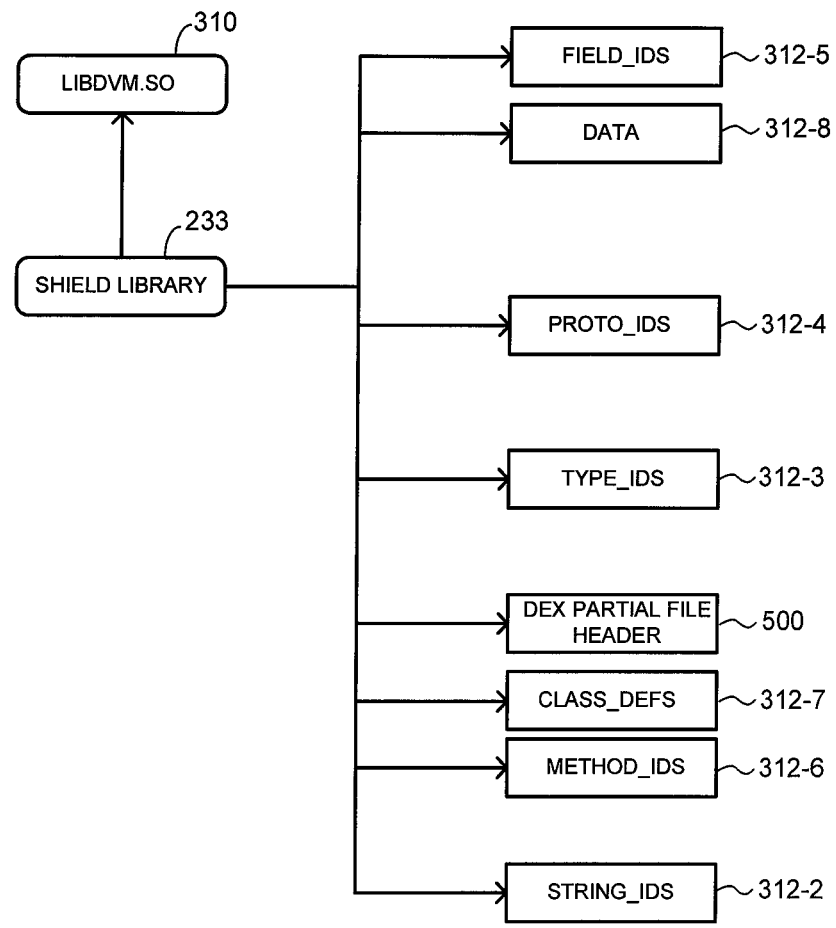
FIG. 5 shows an example memory layout of decrypted DEX program code segments in memory in one embodiment of the present invention.

FIG. 5 shows an example memory layout of decrypted DEX program code segments in memory in one embodiment of the present invention. In the example of FIG. 5, a decrypted DEX program code segment 232 comprises a DEX file part of the original DEX program code. More specifically, decrypting the encrypted DEX program code segments 232 and storing the resulting decrypted DEX program code segments 232 as explained result in a string identifiers list 312-2, a type identifiers list 312-3, a method prototype identifiers list 312-4, a field identifiers list 312-5, a method identifiers list 312-6, a class definitions list 312-7, and a data area 312-8 being stored in randomly assigned, non-contiguous blocks of memory as schematically illustrated in FIG. 5.

In the example of FIG. 5, the DEX file header 312-1 of the original DEX program code is modified into a DEX partial file header 500 (as in step 407). In one embodiment, the magic number, offset information, etc. may be removed from the DEX file header 312-1 to generate the DEX partial file header 500. More particularly, the DEX partial file header 500 may be generated by filling the original DEX file header 312-1 with mock data (e.g., random, irrelevant data) except that the id size fields are kept intact. Filling the original DEX file header 312-1 with mock data removes the magic number and other identifiers that may be used by cybercriminals for reverse engineering. The resulting non-standard memory layout of the DEX file parts in memory also make reverse engineering using off-the-shelf tools relatively difficult.

Continuing with the example of FIG. 4, a mock DEX program code may be loaded (step 408) using the DexClassLoader provided by the ANDROID framework. The mock DEX program code is so-named because it has no relationship with the original DEX program code. Loading the mock DEX program code causes the DEX search list in the Dalvik VM to hold a pointer to the mock DEX program code.

When the mock DEX program code is loaded, program code of the libdvm.so of the Dalvik VM parses the mock DEX program code and stores the result of the parsing in the C programming language structs DvmDex and DexFile, which are also referred to herein as "parsed mock DEX structures." The parsed mock DEX structures may be found in the Dalvik VM (step 409) by, for example, using the reflect method from the ANDROID framework to get the DexFile JAVA object, which represents the currently loaded DEX program code in the Dalvik VM. The DexFile JAVA object has an integer member field, which is the pointer to the C struct DexOrJar. The just-mentioned pointer can be used to access the DexOrJar struct, which holds a member pointer to a DvmDex struct. The DvmDex struct, in turn, holds a member pointer to a DexFile struct. The pointer to the parsed mock DEX struct may then be set to point to the parsed DEX struct (step 410). More specifically, the member pointer to the DvmDex struct that was created by loading the mock DEX program code may be replaced by the pointer to the DvmDex struct that was created by parsing the decrypted DEX program code segments 232 (in step 406). Accordingly, the decrypted DEX program code segments 232 with non-standard format and random memory layout as in FIG. 5 are properly parsed and loaded for execution in the Dalvik VM.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting program code of apps of mobile computing devices, the method comprising:
receiving a package file in a mobile computing device, the package file comprising a plurality of encrypted Dalvik executable (DEX) program code segments that are stored in separate files in the package file;

loading the plurality of encrypted DEX program code segments in memory of the mobile computing device;

decrypting the plurality of encrypted DEX program code segments into a plurality of decrypted DEX program code segments;

storing the plurality of decrypted DEX program code segments in separate and non-contiguous blocks of the memory; and parsing the plurality of decrypted DEX program code segments for loading and execution by a Dalvik process virtual machine of the mobile computing device.

2. The method of claim 1, wherein storing the plurality of decrypted DEX program code segments in the separate and non-contiguous blocks of the memory comprises:

allocating a plurality of memory blocks in the memory;

randomly assigning each of the plurality of decrypted DEX program code segments in a memory block in the plurality of memory blocks; and storing the plurality of decrypted DEX program code segments in corresponding randomly assigned memory blocks.

3. The method of claim 2, wherein a number of memory blocks allocated in the memory is greater than a number of the plurality of decrypted DEX program code segments.

4. The method of claim 3, further comprising releasing memory blocks that have not been assigned to any of the plurality of decrypted DEX program code segments.

5. The method of claim 1, further comprising:

modifying a decrypted DEX program code segment in the plurality of decrypted DEX program code segments.

6. The method of claim 5, wherein the decrypted DEX program code segment is modified by removing a magic number from the decrypted DEX program code segment.

7. The method of claim 5, wherein the decrypted DEX program code segment is modified by filling the decrypted DEX program code segment with mock data.

8. A system for protecting program code of apps of mobile computing devices, the system comprising:

a server computer that splits an original Dalvik executable (DEX) program code of an original DEX file into a plurality of the DEX program code segments, encrypts the plurality of DEX program code segments into a plurality of encrypted DEX program code segments, and packages the plurality of encrypted DEX program code segments in separate encrypted DEX program code segment files in an ANDROID operating system application package (APK) file; and a mobile computing device that receives the APK file, loads the plurality of encrypted DEX program code segments in memory of the mobile computing device, decrypts the plurality of encrypted DEX program code segments into a plurality of decrypted DEX program code segments, stores the plurality of decrypted DEX program code segments in the memory, and parses the plurality of decrypted DEX program code segments, wherein the plurality of decrypted DEX program code segments are stored in separate and non-contiguous blocks of the memory.

9. The system of claim 8, wherein the mobile computing device comprises a smartphone.

10. The system of claim 8, wherein the mobile computing device allocates a plurality of memory blocks in the memory, randomly assigns each of the plurality of decrypted DEX program code segments in a memory block in the plurality of memory blocks, and stores the plurality of decrypted DEX program code segments in corresponding randomly assigned memory blocks.

11. The system of claim 10, wherein a number of memory blocks allocated in the memory is greater than a number of the plurality of decrypted DEX program code segments.

12. The system of claim 8, wherein the mobile computing device modifies a decrypted DEX program code segment in the plurality of decrypted DEX program code segments.

13. The system of claim 12, wherein the decrypted DEX program code segment is modified by removing a magic number from the decrypted DEX program code segment.

14. The system of claim 12, wherein the decrypted DEX program code segment is modified by filling the decrypted DEX program code segment with mock data.

15. A method of protecting program code of apps of mobile computing devices, the method comprising:

receiving in a mobile computing device a package file of an app, the package file comprising a plurality of encrypted files that are stored in separate files in the package file;

loading encrypted program code segments of the plurality of encrypted files into a memory of the mobile computing device;

decrypting the plurality of encrypted program code segments to generate a plurality of decrypted program code segments; and storing the plurality of decrypted program code segments in the memory, wherein the plurality of decrypted program code segments are stored in non-contiguous memory blocks.

16. The method of claim 15, wherein storing the plurality of decrypted program code segments in the memory comprises:

allocating a plurality of memory blocks in the memory;

randomly assigning each of the plurality of decrypted program code segments in a memory block in the plurality of memory blocks; and storing the plurality of decrypted program code segments in corresponding randomly assigned memory blocks.

17. The method of claim 16, wherein a number of memory blocks allocated in the memory is greater than a number of the plurality of decrypted program code segments.

18. The method of claim 15, further comprising:

parsing the decrypted program code segments for loading and execution by a Dalvik process virtual machine.

\* \* \* \* \*